United States Patent [19]

Grover et al.

[11] Patent Number: 5,317,320
[45] Date of Patent: May 31, 1994

[54] MULTIPLE RADAR INTERFERENCE SUPPRESSOR

[75] Inventors: Richard K. Grover, Scottsdale; Keith M. Kingsbury, Tempe, both of Ariz.

[73] Assignee: Motorola, Inc., Schaumburg, Ill.

[21] Appl. No.: 982,528

[22] Filed: Nov. 27, 1992

[51] Int. Cl.⁵ .................. G01S 13/50; G01S 13/42
[52] U.S. Cl. .................... 342/159; 342/59; 342/103; 342/119
[58] Field of Search ............. 342/59, 102, 103, 159, 342/119

[56] References Cited

U.S. PATENT DOCUMENTS

| | | | |
|---|---|---|---|
| H792 | 6/1990 | Sanval et al. | 342/17 |
| 3,849,779 | 11/1974 | Boyd | 342/77 |
| 3,870,996 | 3/1975 | Miller | 343/18 E |
| 3,911,432 | 10/1975 | Williams | 342/59 |
| 3,942,177 | 3/1976 | Danzer et al. | 342/156 |
| 4,010,468 | 3/1977 | Fishbein et al. | 342/59 |
| 4,045,796 | 8/1977 | Kline, Jr. | 342/103 |
| 4,075,633 | 2/1978 | Lewis | 343/100 LE |
| 4,219,815 | 8/1980 | Fajen et al. | 342/58 |
| 4,381,508 | 4/1983 | Durboraw, III | 343/100 LE |
| 4,573,051 | 2/1986 | Farina | 343/18 E |
| 4,612,549 | 9/1986 | Geyer, Jr. et al. | 343/379 |
| 4,613,862 | 9/1986 | O'Donnell | 342/59 |
| 4,660,042 | 4/1987 | Ekstrom | 342/175 |
| 4,739,329 | 4/1988 | Ward et al. | 342/119 |
| 4,827,263 | 5/1989 | Jones et al. | 342/59 |
| 5,034,748 | 7/1991 | Goedeke et al. | 342/99 |
| 5,041,836 | 8/1991 | Paschen et al. | 342/375 |
| 5,063,387 | 11/1991 | Mower | 342/103 |
| 5,181,039 | 1/1993 | Oswald et al. | 342/119 |

Primary Examiner—John B. Sotomayor
Attorney, Agent, or Firm—Frank J. Bogacz

[57] ABSTRACT

A multiple radar interference suppressor for use in a missile scoring system. The multiple radar interference suppressor phase locks the pulse repetition frequency of each drone (unmanned) aircraft to one other drone of the plurality of aircrafts. The phase of the pulse repetition frequency of each of the transmitting radars of the drones is slightly offset from one another. As a result, mutual interference among the drones transmitting radar signals and receiving radar signals of other drones is overcome. Lastly, the transmitted signals and received signals are encoded so that unwanted reflections and scattering from a target may be substantially eliminated or suppressed.

20 Claims, 7 Drawing Sheets

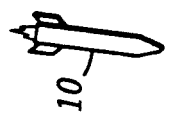
FIG. 1

MULTIPLE RADAR INTERFERENCE SUPPRESSOR

BACKGROUND OF THE INVENTION

The present invention pertains to multiple radars operated in relatively close proximity and more particularly suppressing interference among the operating radars and scattering of the radar's transmitted signals.

Missile scoring systems typically employ a number of drone aircraft (unmanned aircraft). A missile is fired at one or more of the drones and the scoring system determines the flight path of the missile with respect to the drones to determine the potential lethal affect of the missile upon the drones. The drones collect data related to the range between the missile and the drone and report this data to an earth station so that the data may be analyzed to determine the lethal affects of the missile. Such drones are equipped with radars which operate in nearly the same pulse repetition frequency (PRF). In this situation, the interfering signals can appear to move in range with actual target-like characteristics. This is due to the slight difference in PRF among radars which cause the interference signals to appear at small, ever-increasing or decreasing radar range times.

What is needed is a multiple radar interference suppressor which suppresses the radar signals of other transmitting radars and substantially suppresses or eliminates scattered or reflected radar signals or other radars from the missile or other drones.

SUMMARY OF THE INVENTION

In accordance with the present invention, a novel multiple radar interference suppressor is shown.

A multiple radar interference suppressor includes a plurality of sources of radar transmit signals, each of the radar transmit signals being approximately the same in frequency and pulse repetition rate (PRF). A receiver receives each of the plurality of radar transmit signals from the plurality of sources. The receiver is coupled to the plurality of sources via the radar transmit signals. A phase locking arrangement receives the radar transmit signals of one of the plurality of sources and locks a PRF of one source to a prf of a second source of the radar transmit signals. The phase locking arrangement is coupled to the receiver. The pulse repetition frequency of the previously locked received radar transmit signals is phase offset between the first and second sources. The phase offsetter is coupled between the receiver and the phase locking arrangement.

BRIEF DESCRIPTION OF THE DRAWINGS

FIG. 1 is a top view of a plurality of radar drones intersecting a fired missile.

DESCRIPTION OF THE PREFERRED EMBODIMENT

FIG. 1 depicts the flight of a missile 10 fired at a number of drone (unmanned) aircraft 11, 12, and 13. The path of missile 10 intersects the path of drones 11-13 as shown in FIG. 1. Such a system as depicted in FIG. 1 is a missile scoring system. In such a system, a missile is fired at a number of drones. The drones generate a number of ellipsoid shaped missile detection surfaces about the drone. As the missile 10 passes near the drones 11-13, the drones collect multiple range data based on the location of missile 10 relative to each ellipsoid detection surface around each drone 11-13. This data gives the relative position and attitude of the missile 10 to the drone 11-13. The data is collected and transmitted to an earth station (not shown) where the data is analyzed to determine the missile trajectory and the potential lethal affects of the missile upon drones 11-13. In this way, the firing of the missile may be given a score and the score may be used as a learning device to more accurately subsequent missiles.

In the preferred embodiment of the invention, each drone 11-13 is equipped with multiple receive and transmit antennas. Each of the receivers has multiple range gates. Each transmit/receive antenna pair and range gate generates an ellipsoid detection surface. Therefore, each drone 11-13 generates many ellipsoid detection surfaces. As missile 10 penetrates some or all of the ellipsoid detection surfaces of the drone 11-13, data related to the missile 10 to drone range is gathered by each of the drones and transmitted to an earth station (not shown) for subsequent analysis. The transmitted data is analyzed by the earth station and a score representing the lethal affects of the fired missile 10 is determined.

As a result of the transmission of many radar pulses by each of the drones 11-13, the transmitted radar pulses of one drone will be picked up by the receivers of other drones. This is due to the fact that each of the drones operates in approximately the same frequency range. In addition, as the missile 10 penetrates the radar detection surfaces of drones 11-13, the scattered missile echo from all the drones will be detected. These scattered radar echos from other radars are perceived as target reflections. This will cause inaccuracies in the data received by each of the radar systems of each drone 11-13.

The present invention will substantially eliminate or suppress both the direct transmission and the reflected and scattered radar waves from the other drone radars from being received as valid radar returns by the drones 11-13. First, the radars will lock their pulse repetition frequencies (PRF). Next, each received gate will be cleared of other drone's transmitted radar signals. Lastly, scatter and reflection will be eliminated by employing and encoding radar transmission scheme.

Figure 2:
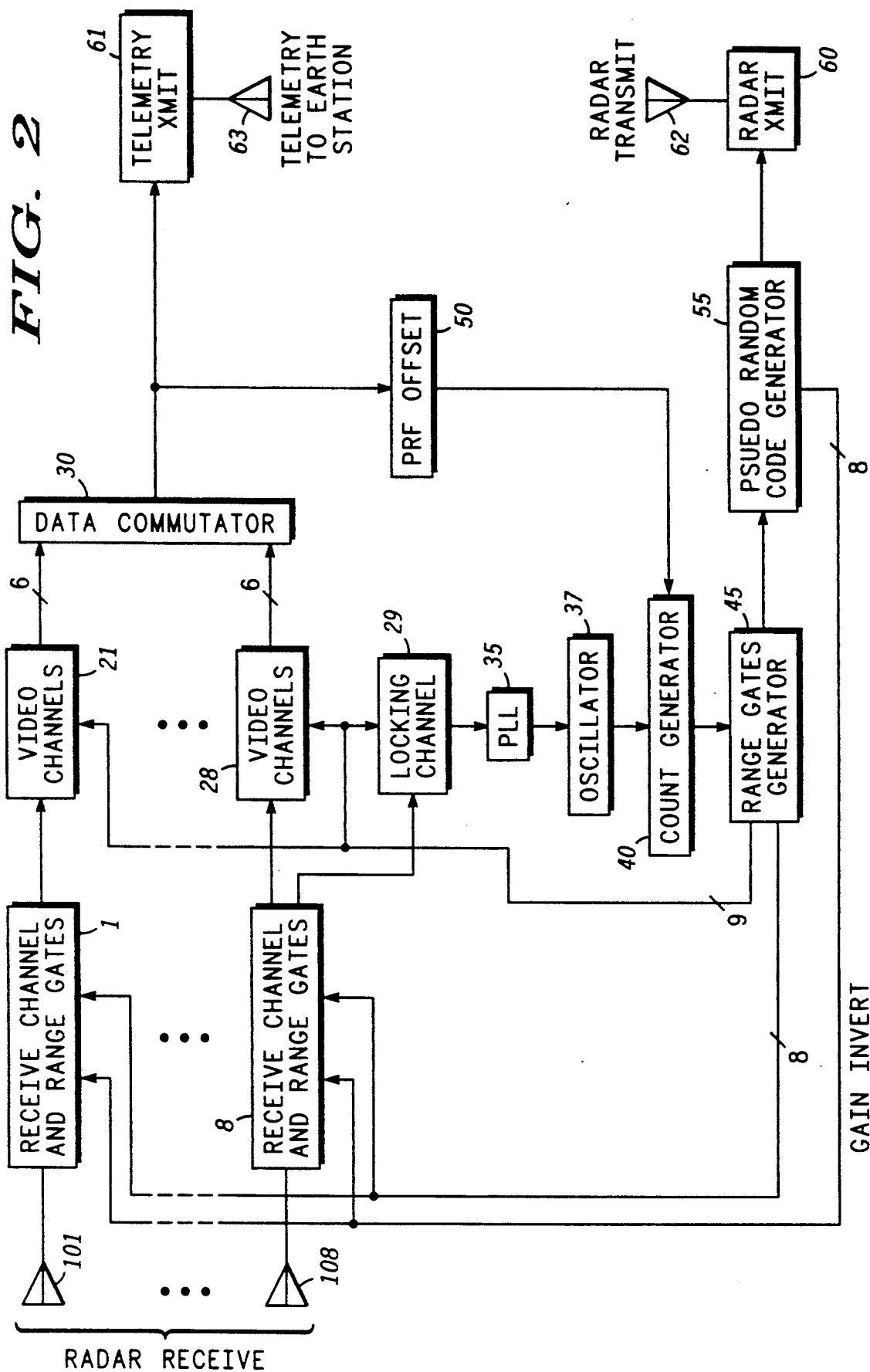
FIG. 2 is a block diagram of a multiple radar interference suppressor in accordance with the present invention.
Figure 3:
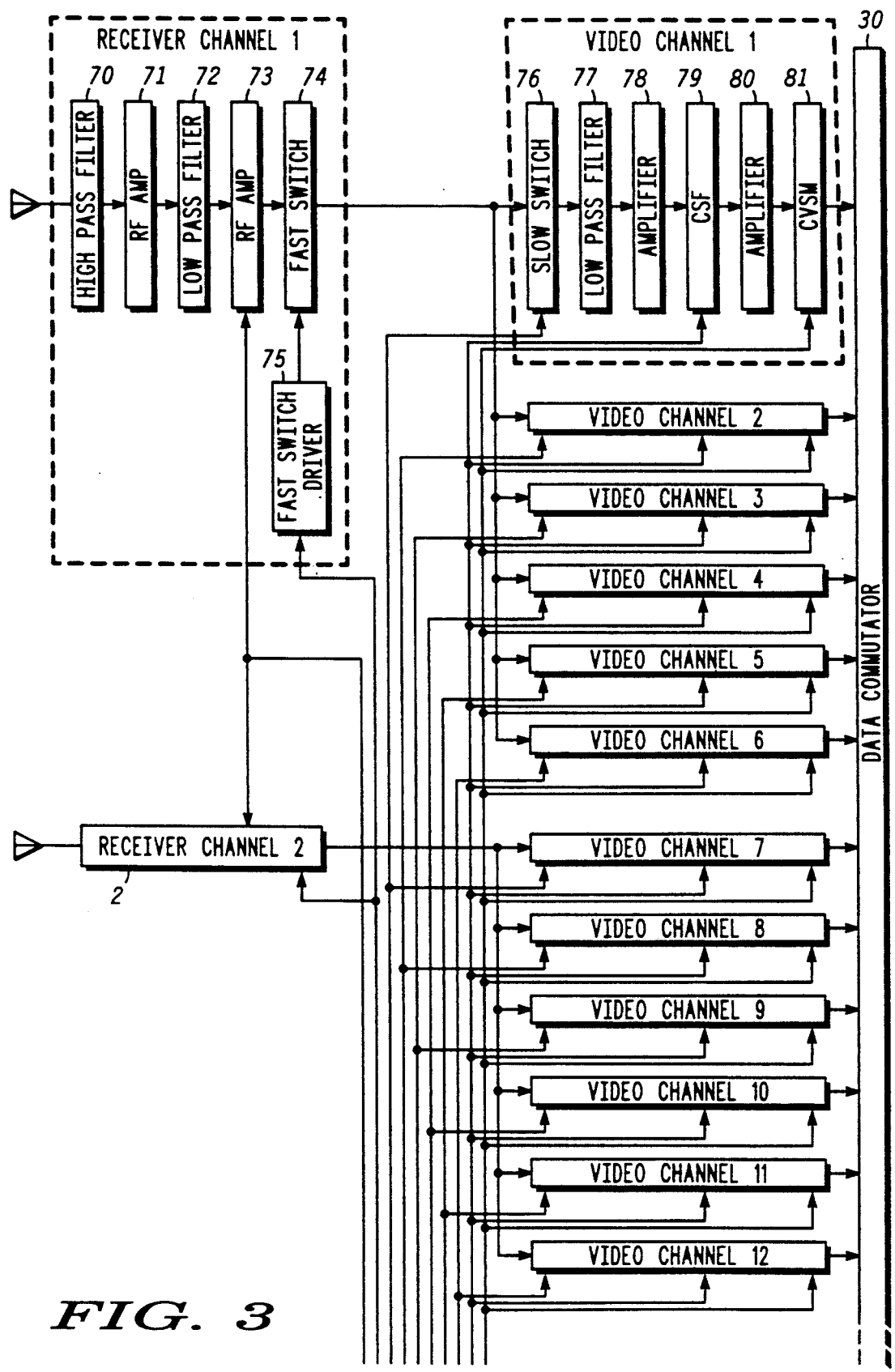
FIG. 3 is a schematic diagram of the multiple radar interference suppressor of FIG. 2.
Figure 4:
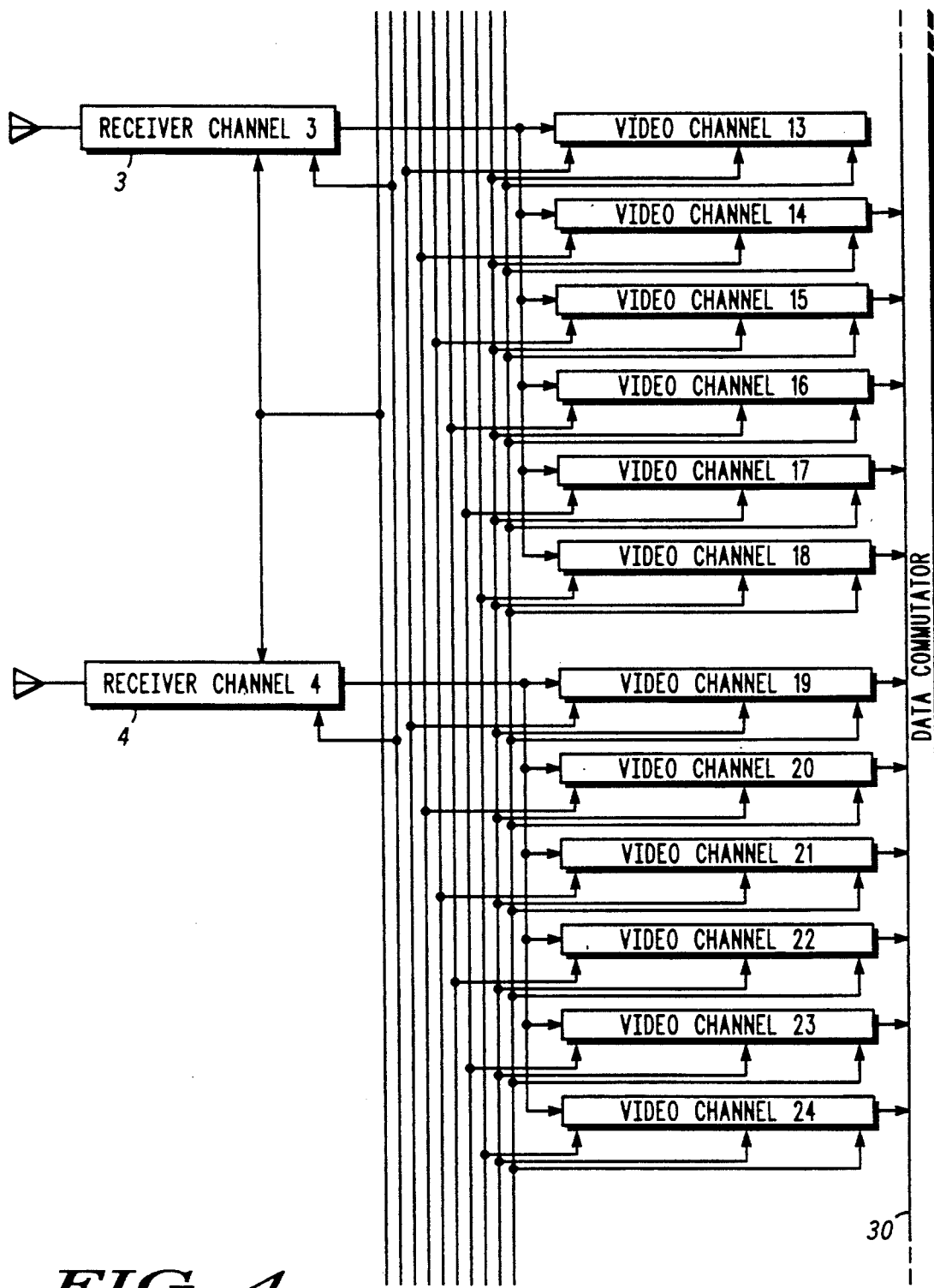
FIG. 4 is a schematic diagram of the multiple radar interference suppressor of FIG. 2.
Figure 5:
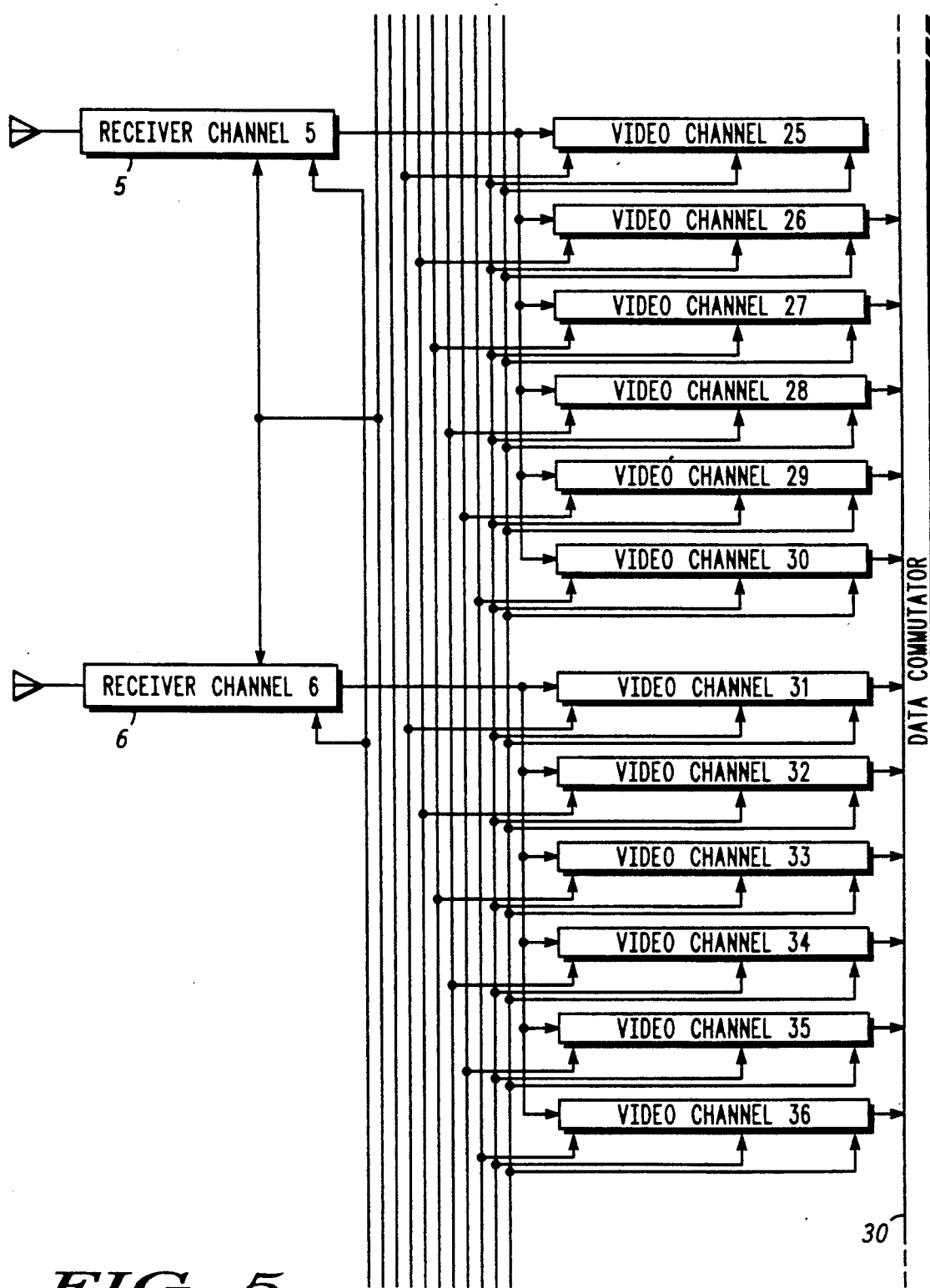
FIG. 5 is a schematic diagram of the multiple radar interference suppressor of FIG. 2.
Figure 6:
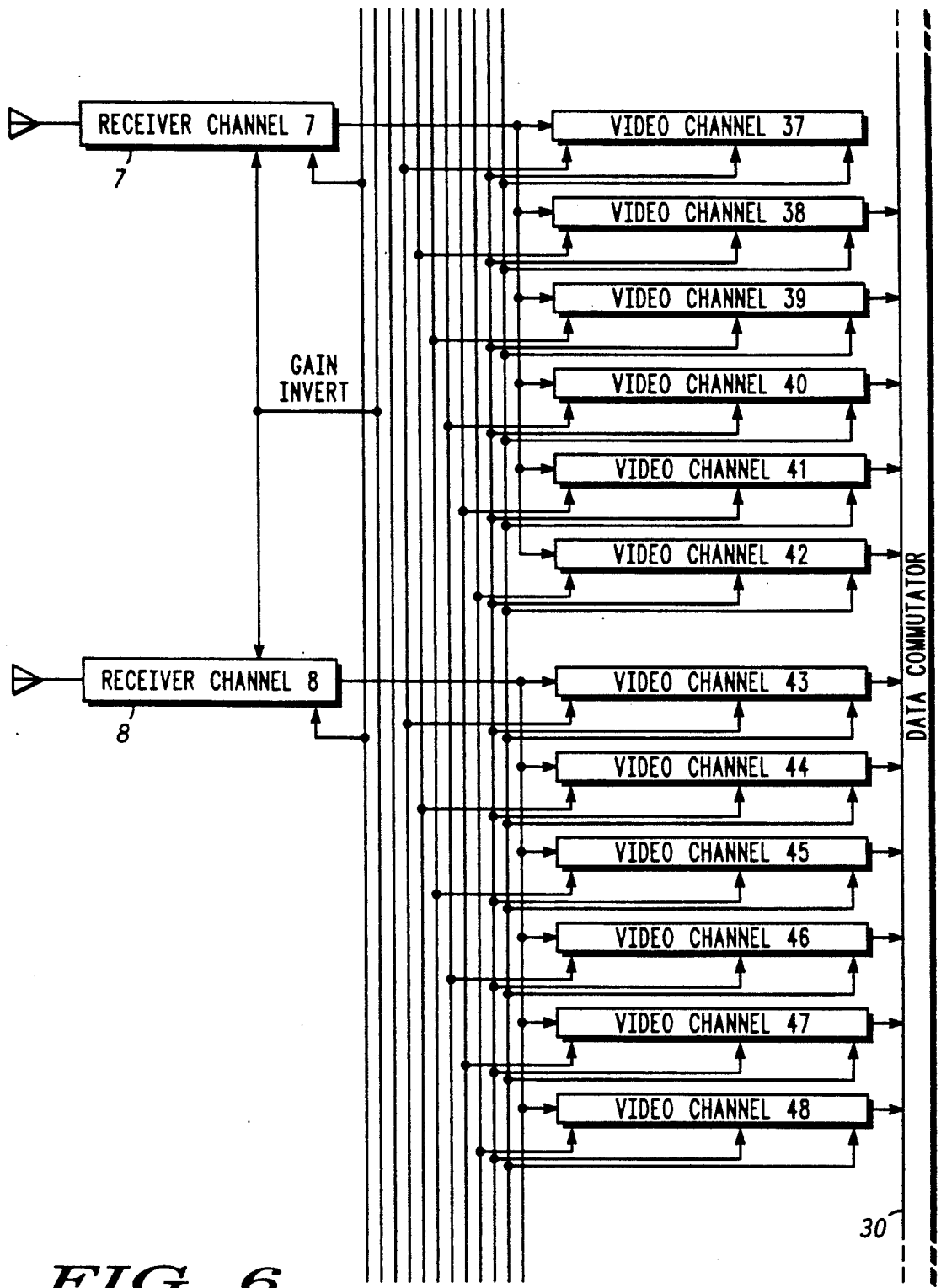
FIG. 6 is a schematic diagram of the multiple radar interference suppressor of FIG. 2.
Figure 7:
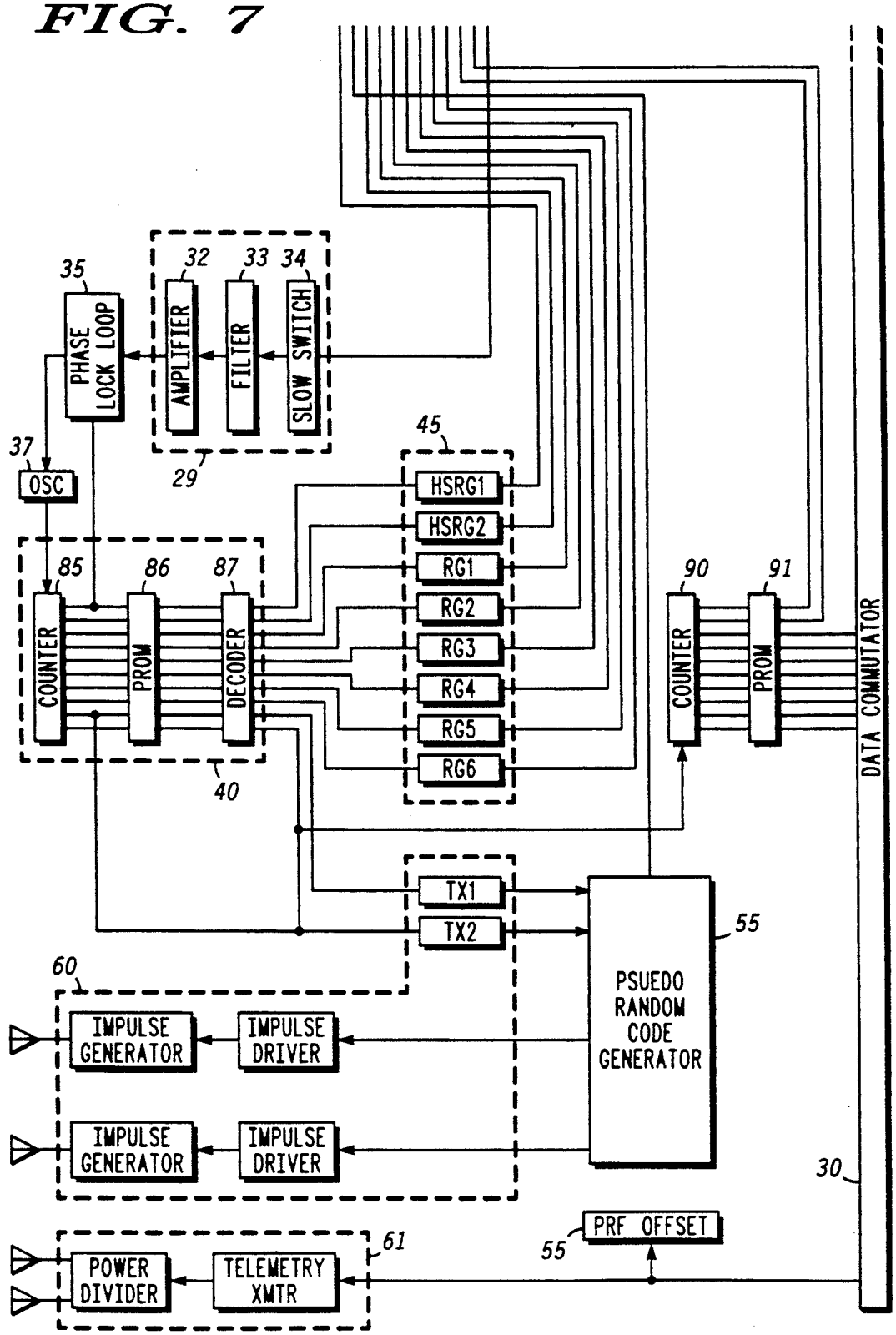
FIG. 7 is a schematic diagram of the multiple radar interference suppressor of FIG. 2.

Referring to FIG. 2, a block diagram of the multiple radar interference suppressor is shown. Antennas 101-108 are the radar receive antennas and are disposed about each drone near the periphery of the plane, such as wings front and rear of the fuselage on the top and bottom of the aircraft. Receive antennas 101-108 are coupled to receive channels and range gates 1-8. Each range gated, receive channel is coupled to a group of video channels, six in the preferred embodiment. Receive channel 1 is coupled to video channels 21. There is a video channel for each range gate. Video channels 21 comprises in the preferred embodiments six video channels. Each of the remaining receive channels is similarly coupled to a group of video channels. Each of the groups of video channels 21-28 are coupled to data commutator 30.

Data commutator 30 is coupled to telemetry transmitter 61 and to PRF offset 50.

Locking channel 29 is coupled to receive channel 8. Any of the other receive channels may be used as the receive channel for locking channel 29. In the preferred embodiment, channel 8 was selected to be the receive channel for locking channel 29. Locking channel 29 is coupled to phase locked loop 35. Oscillator 37 is coupled to phase locked loop 35. Oscillator 37 is coupled to count generator 40. PRF offset 50 is also coupled to count generator 40. Count generator 40 is coupled to range gates generator 45. Range gates generator 45 are coupled to receive channels and range gates 1-8, video channels 21-29, and to pseudorandom code generator 55. Pseudorandom code transmit is coupled via radar transmitter 60 to radar transmit antenna 62.

Each drone includes the circuitry shown in FIG. 2. The eight antennas 101-108 attached to each drone receive RF data and pass this data to a corresponding receive channel and range gates 1-8. Each receive channel and range gate 1-8 is sampling at the pulse repetition rate (PRF) rate. During this period of sampling, six samples are taken by each receive channel and range gate 1-8. These six samples are transmitted to the corresponding video channels. That is, receive channel 1 transmits its 6 data bits to video channels 21 which includes 6 separate processing video channels. Each receive channel samples and filters out signals which are not in the range used for the radar transmit. However, since multiple drones are employed, each radar receive channel will be receiving radar transmissions directly from the other drones as well as its own and other radars' scatter and reflected radar signals from a missile or any other objects. Each video channels 21-28 transmits 6 bits in parallel to data commutator 30. Data commutator 30 transmits this information relative to the radar status of the detected missile through telemetry transmitter 61 and antenna 63 to an earth station (not shown). The earth station collects and deciphers data to determine the proximity of the missile to the drones and provides a resultant score of each missile firing.

Locking channel 29 gathers data from receive channel 8 and provides this data to phase locked loop 35 so that phase locked loop 35 may lock the radar PRF of one drone to another drone such that the direct radar signals of the other drone no longer change in relative range. This PRF locking causes a majority of the direct transmissions from the other drones no longer occur in the range gate intervals. However, it is possible that a direct transmission from one of the other drones will occur within one of the multiple range gates. If this interference occurs, it is detected by the PRF offset 50 which then offsets the phase of that radar's PRF so that the interfering pulse no longer occurs within a range gate interval. As a result, each drone locks to one other drone's PRF and if that drone has a gate receiving interference from another drone, the PRF phase of the drone is slightly altered to prevent any interference. Oscillator 37 produces the basic clock signal for count generator 40. Count generator 40 then determines the PRF for receive the channels and range gates 1-8 and the lower speed processing frequency of video channels 21-29. This PRF signals are then utilized by the range gates generator 45 to control the range gates in the receive channels and range gates 1-8 and video channels 21-29. The range gate signals transmitted from range gates generator 45 to receive channels 1-8 and video channels 21-29 drive the sampling process of each of the channels.

Data commutator 30 is also coupled to PRF offset 50.

When one drone phase locked loops to the radar transmissions of another drone, some of the range gates of the first drone may be synchronized with the transmit radar pulses of the other drone since these signals will move slightly in time. In order to avoid a particular channel constantly picking up transmitted radar signals from the other drone to which it locked, PRF offset 50 produces a slight phase offset of the radar transmit signal of its own drone. This phase offset is fed into count generator 40 and to range gates generator 45 which offset the 2 MHz sampling slightly so that certain receive channels are not synchronized to another drone's transmitter. As a result of phase locking to another drone by phase locked loop 35 and offsetting the pulse repetition frequency by PRF offset 50, the effects of radar transmit signals from other drones has been substantially eliminated so that the receive channels can distinguish their own echo return signals from the direct transmissions of other drones.

In order to substantially eliminate scatter and reflections from the target caused by the other drone radars from interfering with the receive channels of each drone, pseudorandom code generator 55 provides ON/OFF control to the radar transmitter 60 and gain inversion signals to the receive channels and range gates 1-8. When the pseudorandom code generator 55 output is a logic "1" the radar transmitter 60 radiates a pulse at its normal PRF time, and the receive channels and range gates 1-8 have normal gain polarity. When the pseudorandom code generator 55 output is a logic "0", the radar transmitter 60 does not radiate and the receive channels and range gates 1-8 have inverted gain polarity signals. Since the generated bit pattern is pseudorandom in nature among the drones, the reflected and scattered radar signals from other drone radars will fall approximately equally into half the time when receive channels and range gates 1-8 have inverted polarity and half the time when there is normal gain polarity. Over a relatively large number of PRFs, which is not a long real time, due to the high sampling rate, the scattered and reflection signals from other drone radars will effectively cancel out. Since the scatter and reflected echo signals from its own radar transmitter 60 will all be received with the same (normal) gain polarity those signals will properly integrate into the valid data received. As a result, all extraneous interference has been suppressed or eliminated. Transmit interference directly from other drones has been eliminated by phase locking and pulse repetition frequency offsetting. Scatter and reflection from the target caused by other drone radars has been substantially eliminated by providing pseudorandom code transmitter for the radar transmit signals and receiving with this same pseudorandom code.

FIGS. 3 through 7 depict the details of each receive channel and range gate 1-8 includes the antenna coupled to a high pass filter 70. High pass filter 70 FIGS. 3 through 7 are to be aligned vertically with FIG. 3 at the top and FIGS. 4 through 7 following in sequence is coupled through RF amplifier 71 to low pass filter 72 which removes other external interference signals. RF amplifier 73 is coupled to low pass filter 72 and is switched between normal and inverted gain polarity according to pseudorandom code generator 55. Fast switch 74 is coupled to RF amplifier 73 and provides multiple range gate sampling.

Fast switch driver 75 couples high speed range gate (HSRG) 1 to fast switch 74. Each group of video channels 21-28 includes 6 video channels. Each video channel comprises a slow switch 76 coupled to fast switch 74. Slow switch 76 is coupled to low pass filter 77. Amplifier 78 is coupled to low pass filter 77. Capacitive switched filter 79 is coupled to amplifier 78. Amplifier 80 is connected to capacitive switched filter 79. Continuously variable slope modulator 81 is coupled between data commutator 30 and amplifier 80. Data commutator 30 transmits data through telemetry transmitter 61 to an earth station (not shown).

Locking channel 29 includes slow switch 82 coupled between receiver channel 8 and filter 83. Filter 83 is coupled to amplifier 84. Amplifier 84 produces the locking signal which is coupled to and controls phase locked loop 35. Oscillator 37 is coupled between phase locked loop 35 and counter 85. Oscillator 37 is frequency controlled by phase locked loop 35 and feeds clock signals to counter 85. Count generator 40 includes counter 85 which is coupled to PROM 86 which in turn is coupled to register 87. Counter 85 selects the appropriate gating time from PROM 86 and transmits these times to register 87. Register 87 sets the sample times to each of the receive channels and video channels. Range gates generator 45 are coupled to register 87. Range gates 45 includes two high speed range gates HSRG1 and HSRG2. High speed range gate 1 (HSRG1) is coupled to receive channels 5-8 and similarly, high speed range gate 2 (HSRG2) is coupled to receive channels 1-4. Range gates RG1-RG6 are coupled to video channels 1-6 of each video channel group 21-28. The RG1-RG6 provide the timing signals necessary for the operation of each of the video channels. Register 87 also provides the timing necessary for the radar telemetry transmit 61 operation. The transmit timing is transmitted from register 87 to range gates TX1 and TX2. TX1 and TX2 transmit their signals through pseudorandom code generator 55 which enables which PRF interval the twin radar transmitter 60 will radiate.

Lastly, counter 90 is coupled to counter 85. PROM 91 is coupled to counter 90 and provides the timing necessary for each of the video channels of each video channel group for the capacitive switched filter CSF and for the continuously variable slope modulator CVSM.

The present invention is particular useful for multiple high pulse repetition frequency radars in the same frequency band. The present invention is a relatively simple mechanism for locking one drone to another and offsetting each PRF from the other slightly. In addition, radar scatter and reflection echos from other drone radars are substantially eliminated by encoding the radar transmissions and decoding the radar receptions. The present arrangement is simple and cost effective when compared to technologies which used widely spaced pulse repetition frequencies, intra-pulse modulation or RF phase coherent technologies to perform interference suppression.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A multiple radar interference suppressor comprising:
   a plurality of sources of radar transmit signals, said radar transmit signals having approximately the same frequency;
   means for receiving said radar transmit signals, said means for receiving coupled to said plurality of sources of radar transmit signals;
   means for phase locking a pulse repetition frequency of said received radar transmit signals of a first of said plurality of sources to a second of said plurality of said sources, said means for phase locking coupled to said means for receiving; and
   means for phase offsetting the pulse repetition frequency of said locked, received radar transmit signals of said first and second sources, said means for phase offsetting coupled between said means for receiving and said means for phase locking.

2. A multiple radar interference suppressor as claimed in claim 1, wherein there is further included:
   means for pseudorandomly encoding said radar transmit signals of each of said plurality of sources, said means for pseudorandomly encoding coupled to said means for phase locking; and
   transmit means for transmitting said pseudorandomly encoded radar transmit signals, said transmitter means coupled to said means for pseudorandomly encoding.

3. A multiple radar interference suppressor as claimed in claim 2, wherein there is further included means for pseudorandomly enabling said means for receiving so that said means for receiving only radar transmit signals encoded by said means for pseudorandomly encoding while rejecting improperly coded radar transmit signals.

4. A multiple radar interference suppressor as claimed in claim 3, wherein said means for receiving includes:
   a plurality of receive channel means, each of said receive channel means for sampling said radar transmit signals at a high sample rate; and
   a plurality of antenna means corresponding to said receive channel means, each of said antenna means for receiving said radar transmit signals, said plurality of antenna means coupled to said plurality of receive channel means on a one-for-one basis.

5. A multiple radar interference suppressor as claimed in claim 4, wherein said means for receiving further includes a plurality of video channel group means for receiving said sampled radar transmit signals and providing a plurality of bits describing the rate of change of said received radar transmit signals, said video channel group means coupled to a corresponding receive channel means on a one-for-one basis.

6. A multiple radar interference suppressor as claimed in claim 5, wherein each of said video channel group means includes a plurality of video channel means, each of said video channel means providing one-bit indicating a slope of said received radar transmit signals, each of said plurality of video channel means being coupled to said corresponding receive channel means.

7. A multiple radar interference suppressor as claimed in claim 6, wherein said means for receiving further includes:
   data commutator means coupled to each of said plurality of video channel means of each of said plurality of video channel group means, said data commutator means for storing each of said plurality of slope bits of each of said plurality of video channel means; and transmitter means for transmitting each of said stored slope bits to a central collection station.

8. A multiple radar interference suppressor as claimed in claim 6, wherein said means for phase locking includes locking channel means for receiving samples of said received radar transmit signals and producing a locking bit stream of said received radar transmit signal, said locking channel means being couple to a predefined one of said plurality of receive channel means.

9. A multiple radar interference suppressor as claimed in claim 8, wherein said means for phase locking further includes:

phase locked loop means for locking said pulse repetition frequency of said received radar transmit signal to a pulse repetition frequency of a transmitted radar transmit signal of a particular source, said phase locked loop means being coupled to said locking channel means; and oscillator means for providing signals for controlling said sampling by said receive channel means, said oscillator means coupled to said phase locked loop means.

10. A multiple radar interference suppressor as claimed in claim 9, wherein said means for phase locking further including:

count generator means for producing pulse streams representing the sampling rate of said receive channel means, of said video channel means and of said transmitter means, said count generator means coupled to said oscillator means; and range gate means for storing and forwarding said pulse streams of said receive channel, said video channel means, and said transmitter means, said range gate means coupled to said receive channel means, to said video channel means, and to said transmitter means.

11. A multiple radar interference suppressor as claimed in claim 4, wherein:

said means for pseudorandomly enabling is coupled to each of said plurality of received channel means; and said means for pseudorandomly encoding and said means for pseudorandomly enabling are synchronized.

12. A multiple radar interference suppressor as claimed in claim 10, wherein each of said receive channel means includes:

a high pass filter coupled to one of said plurality of antenna means;
a first RF amplifier coupled to said high pass filter;
a low pass filter coupled to said first RF amplifier;
a second RF amplifier coupled to said low pass filter; and
fast switching means coupled to said second RF amplifier and to said range gate means.

13. A multiple radar interference suppressor as claimed in claim 10, wherein each of said video channel means includes:

slow switching means coupled to said receive channel means;
a low pass filter coupled to said slow switching means;
a first amplifier coupled to said low pass filter;

a capacitive switched filter coupled to said first amplifier;
a second amplifier coupled to said capacitive switched filter; and
a continuously variable slope modulator coupled to said second amplifier and to said range gate means.

14. A multiple radar interference suppressor as claimed in claim 10, wherein said count generator means includes:

a counter coupled to said oscillator means;
a programmable read only memory coupled to said counter; and
a register coupled between said programmable read only memory and said range gate means.

15. A missile scoring system for determining the affect of a fired missile on a plurality of drone aircraft (drone), said missile scoring system comprising:

each of said plurality of drones including a source of radar transmit signals, each said radar transmit signal having approximately the same frequency as other signals of said drones;

each of said plurality of drones including:

means for receiving said radar transmit signals, said means for receiving coupled to said plurality of sources of radar transmit signals;

means for phase locking a pulse repetition frequency of said received radar transmit signals of said one drone to another of said plurality of drones, said means for phase locking coupled to said means for receiving;

means for phase offsetting the pulse repetition frequency of said locked, received radar transmit signals of said one and another of said drones, said means for phase offsetting coupled between said means for receiving and said means for phase locking; and means for transmitting a slope of said received radar transmit signals to an earth station for subsequent scoring analysis.

16. A missile scoring system as claimed in claim 15, wherein there is further included:

means for pseudorandomly encoding said radar transmit signals of each of said plurality of sources, said means for pseudorandomly encoding coupled to said means for phase locking; and transmit means for transmitting said pseudorandomly encoded radar transmit signals, said transmitter means coupled to said means for pseudorandomly encoding.

17. A missile scoring system as claimed in claim 16, wherein there is further included means for pseudorandomly enabling said means for receiving only radar transmit signals encoded by said means for pseudorandomly encoding while rejecting improperly coded radar transmit signals.

18. A missile scoring system as claimed in claim 15, wherein said means for receiving includes:

a plurality of receive channel means, each of said receive channel means for sampling said radar transmit signals at a high sample rate; and a plurality of antenna means corresponding to said receive channel means, each of said antenna means for receiving said radar transmit signals, said plurality of antenna means coupled to said plurality of receive channel means on a one-for-one basis.

19. A missile scoring system as claimed in claim 18, wherein said means for receiving further includes a plurality of video channel group means for receiving said sampled radar transmit signals and providing a plurality of bits describing the rate of change of said received radar transmit signals, said video channel group means coupled to a corresponding receive channel means on a one-for-one basis.

20. A missile scoring system as claimed in claim 19, wherein each of said video channel group means includes a plurality of video channel means, each of said video channel means providing one-bit indicating a slope of said received radar transmit signals, each of said plurality of video channel means being coupled to said corresponding receive channel means.

* * * * *